United States Patent [19]
Wexler et al.

[11] Patent Number: 6,123,295
[45] Date of Patent: Sep. 26, 2000

[54] FUEL TANK FOR LIFTING BODY RE-ENTRY VEHICLE

[75] Inventors: Mark Harry Wexler, Kent, Wash.; Peter Andrew Buck, Valencia, Calif.; Timothy D. Iwanczyk, Slidell, La.

[73] Assignee: Lockheed Martin Corporation, Palmdale, Calif.

[21] Appl. No.: 09/009,355

[22] Filed: Jan. 20, 1998

[51] Int. Cl.[7] .................................................. B64G 1/10
[52] U.S. Cl. ..................... 244/160; 244/172; 244/135 R; 244/119
[58] Field of Search .............................. 244/172, 158 R, 244/135 R, 2, 160, 162

[56] References Cited

U.S. PATENT DOCUMENTS

| | | | |
|---|---|---|---|
| 2,967,034 | 1/1961 | Eyre | 244/36 |
| 3,261,571 | 7/1966 | Pinnes | 244/135 R |
| 3,955,784 | 5/1976 | Salkeld | 244/172 |
| 3,979,005 | 9/1976 | Robinson et al. | 244/135 R |
| 5,395,072 | 3/1995 | Nelson | 244/160 |

FOREIGN PATENT DOCUMENTS

| | | | |
|---|---|---|---|
| 763292 | 7/1967 | Canada | 244/160 |
| 1288447 | 1/1969 | Germany | 244/162 |

*Primary Examiner*—Galen L. Barefoot
*Attorney, Agent, or Firm*—Robert A. Schruhl

[57] ABSTRACT

An improved fuel tank for a lifting body re-entry vehicle having a particular external shape comprising four elongated lobes each having an external surface, each of the external surfaces having selected cylindrical and conical shapes, the lobes being selectively mateable to form a combined external configuration having a multiplicity of cylindrical and conical shapes conformable to at least a portion of the external shape of the vehicle. The cylindrical and conical shapes have variable radii at selected cross-sections thereof, such radii being selected for forming the external configuration. In a particular embodiment, the fuel tank has an initial portion, a midsection portion and a final portion and the cross-sectional shape of the initial portion of the fuel tank is that of two overlapping circles whose centers are positioned above one another, each of the circles being formed by two of the four lobes. In the midportion of the fuel tank, the cross-sectional shape is that of four overlapping circles whose centers are positioned to form a four-lobed closed arcuate figure. In the final portion of the fuel tank, the cross-sectional shape of the fuel tank is that of two overlapping circles whose centers are positioned aside one another, each of the circles being formed by two of the four lobes. When two such fuel tanks are placed side-by-side, the combined external surfaces closely approximate a large portion of the shape of the re-entry vehicle.

3 Claims, 9 Drawing Sheets

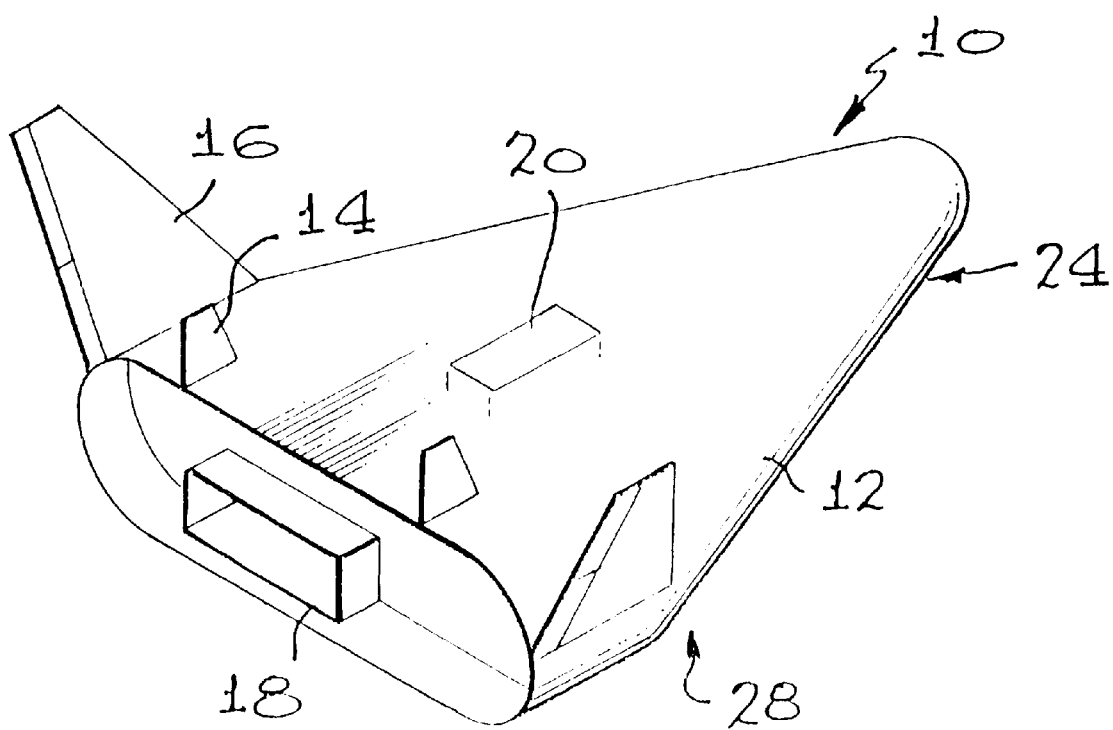

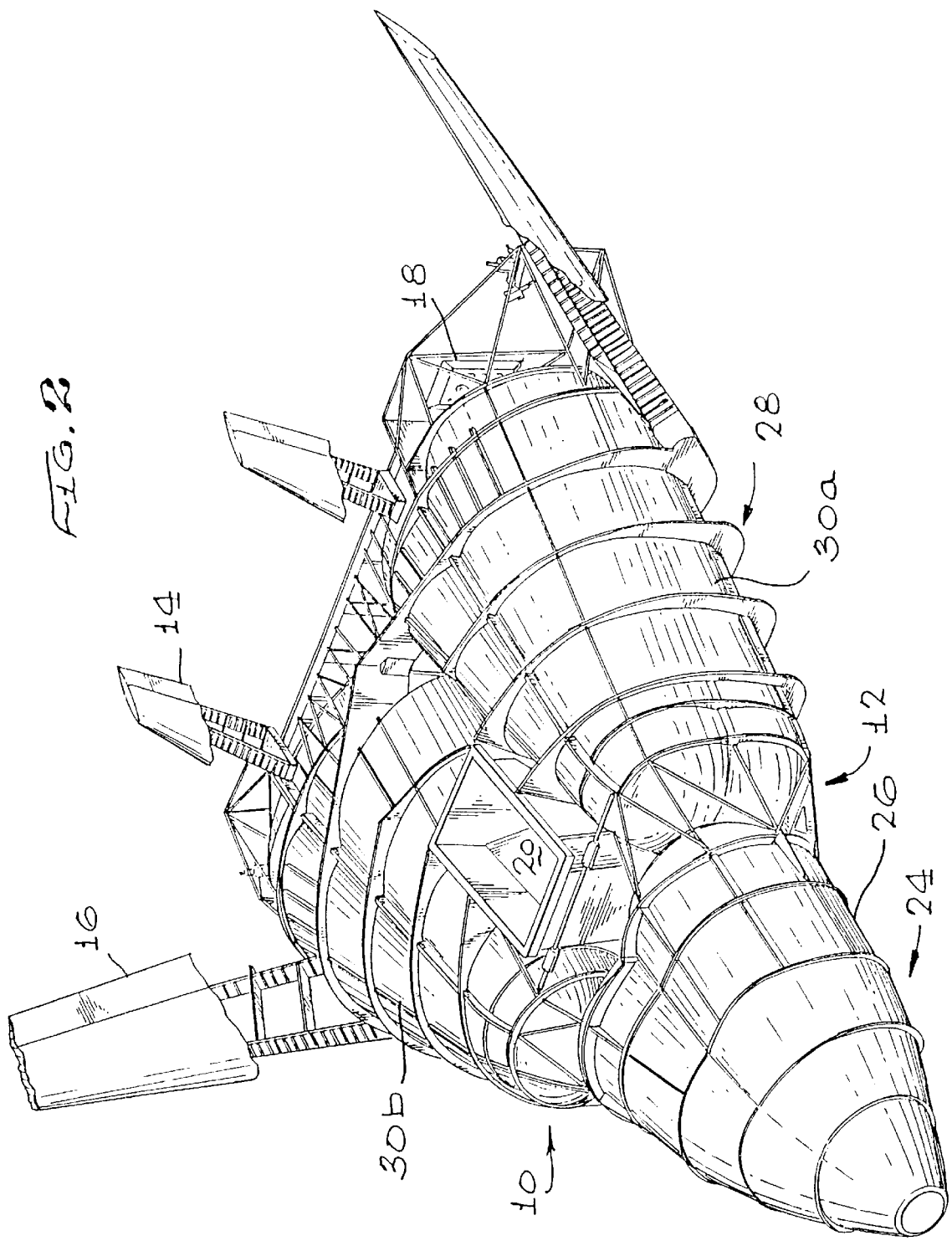

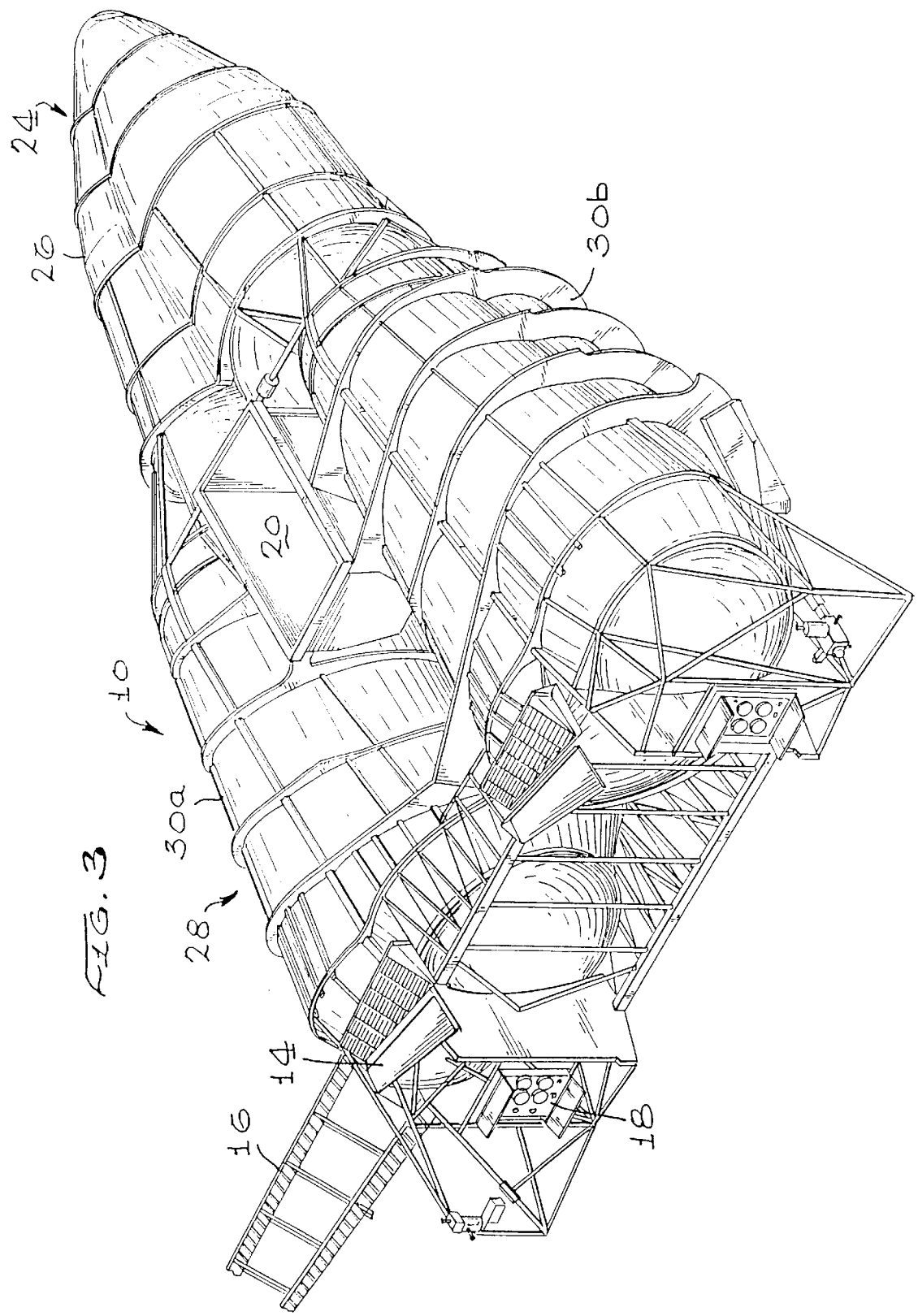

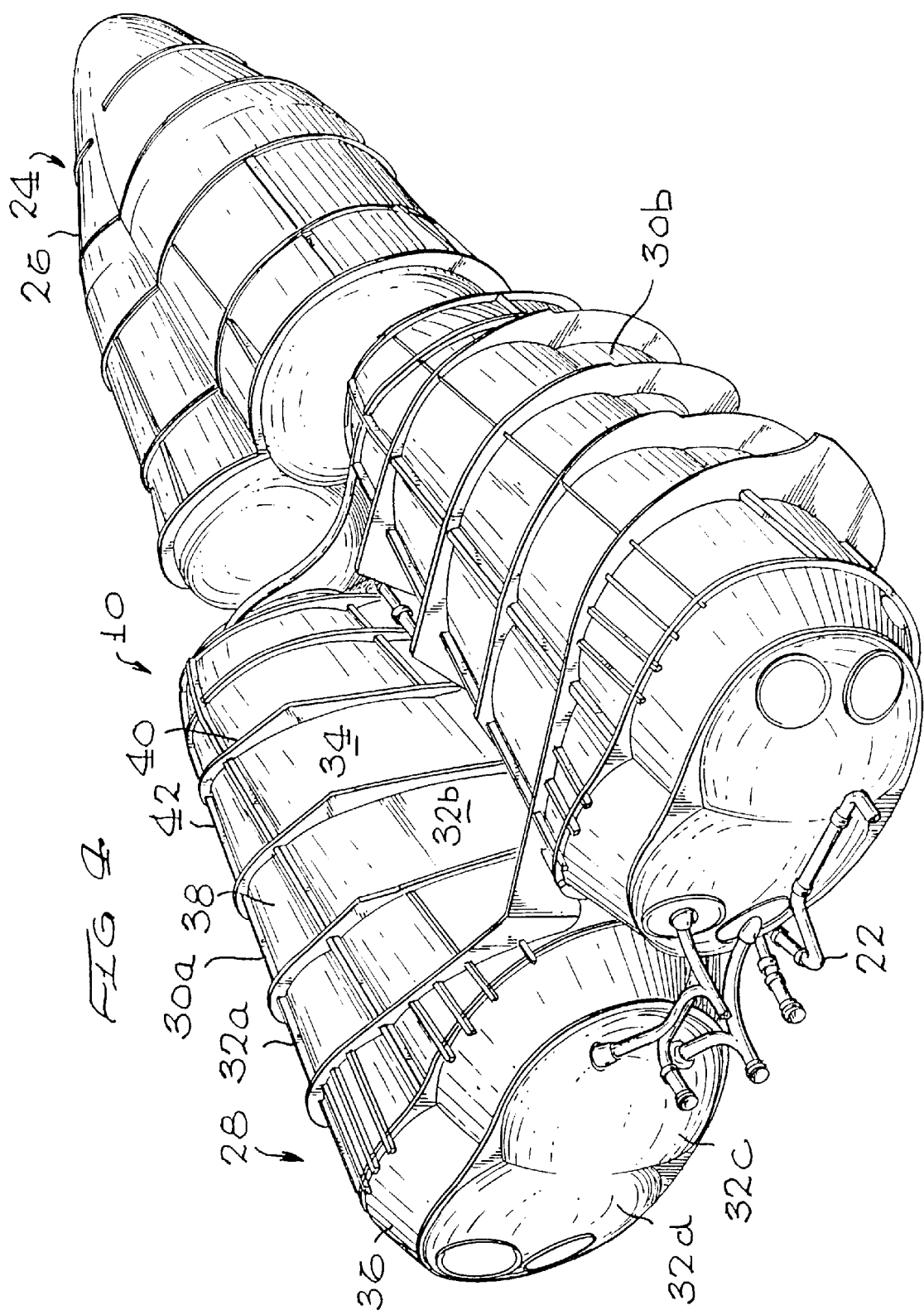

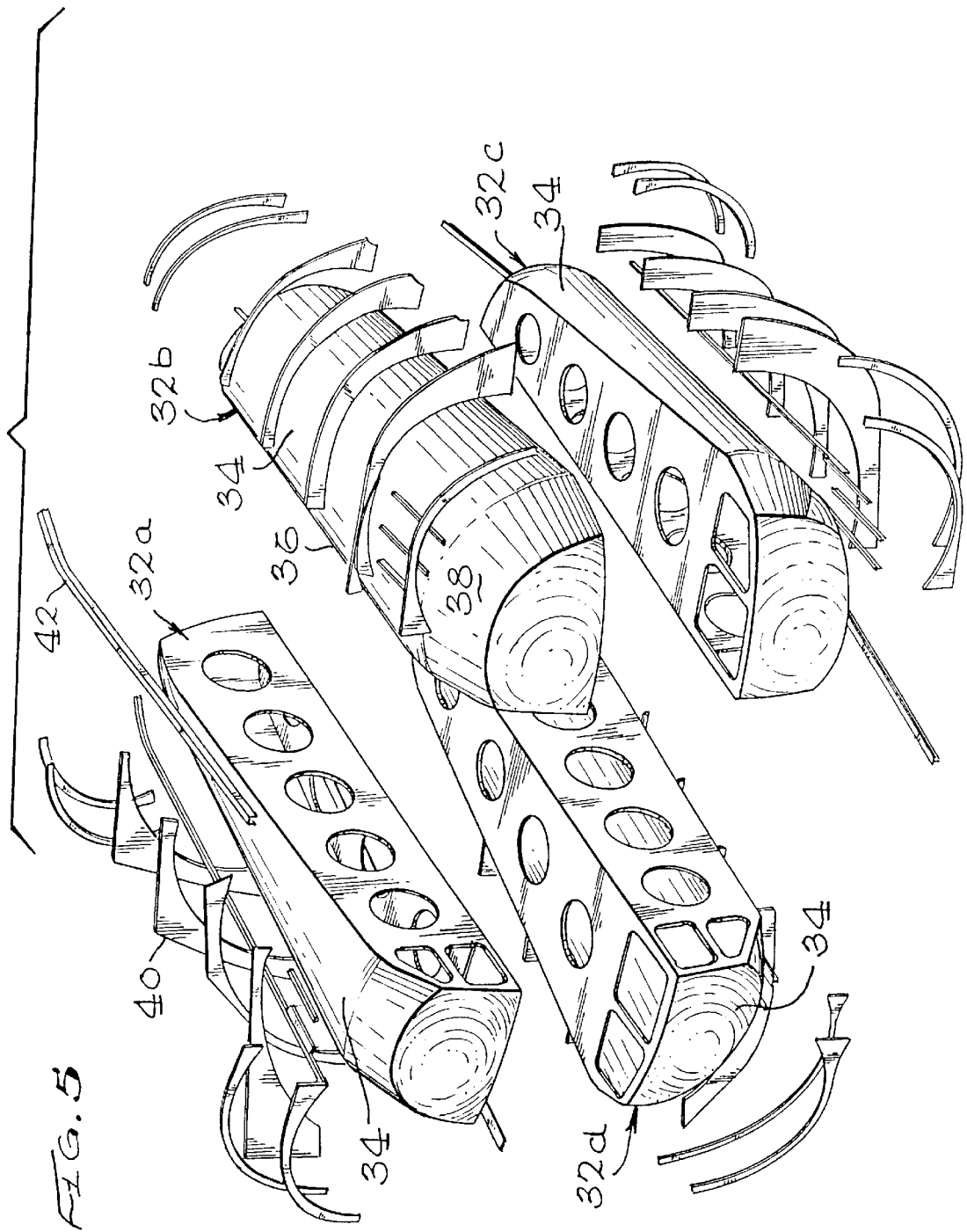

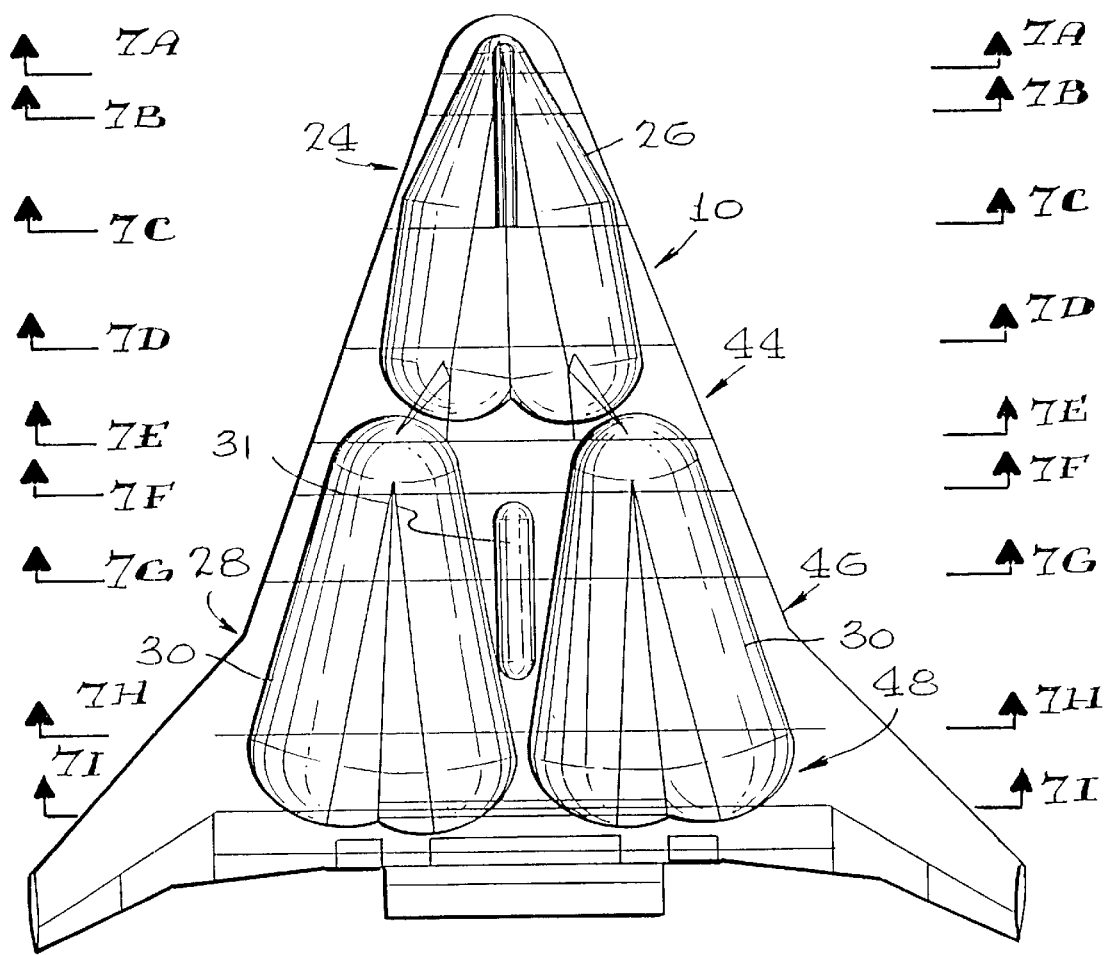

FUEL TANK FOR LIFTING BODY RE-ENTRY VEHICLE

BACKGROUND OF THE INVENTION

1. Field of the Invention

This invention relates to the field of re-entry vehicles and, in particular, to an improved multilobe fuel tank for a lifting body re-entry vehicle.

2. Description of Related Art

With the increased desire to efficiently employ a lifting body re-entry vehicle in earth to orbit and return, it has been necessary to design configurations of such a vehicle which optimize the parameters of reentry, such as heat control and maneuverability. In addition, since it is desired to efficiently deliver payloads to orbit and return the vehicle to earth, thus providing an desired payload weight to orbit, it is desired to provide a fuel tank which can optimize the amount of fuel carried inboard of the vehicle, i.e. a single stage design, and have the structural integrity necessary to withstand the stresses of liftoff, maneuvering and landing. An example of such a tank configuration is provided in U.S. Pat. No. 5,395,072, entitled Propellant Tank Conformal Lifting Body Spacecraft. In such patent, the tank, which consists in general of three overlapping elongated cones, has a cross-section which is defined by three constant radius intersecting circles to conform to an afterbody portion of the vehicle which is conically shaped and has radii which vary linearly with length. While this configuration allows a tank to be integrated with a limited range of vehicle envelopes, it does not efficiently pack the required tank volume inside a wide variety of lifting body re-entry vehicle designs and thereby makes such vehicles larger and heavier.

Thus, it is a primary object of the present invention to provide an improved fuel tank for a lifting body re-entry vehicle.

It is another object of the present invention to provide an improved fuel tank for a lifting body re-entry vehicle that is highly volumetric efficient.

It is a further object of the present invention to provide an improved fuel tank for a lifting body re-entry vehicle that is conformal to the vehicle shape and maintains a high packing efficiency.

It is still another object of the present invention to provide an improved fuel tank for a lifting body re-entry vehicle that is conformal to the vehicle shape and has tank walls that have hoop tension stresses for a lightweight design.

SUMMARY OF THE INVENTION

An improved fuel tank for a lifting body re-entry vehicle having a particular external shape is provided comprising four elongated lobes each having an external surface, each of the external surfaces having selected cylindrical and conical shapes, the lobes being selectively mateable to form a combined external configuration having a multiplicity of cylindrical and conical shapes conformable to at least a portion of the external shape of the vehicle. The cylindrical and conical shapes have variable radii at selected cross-sections thereof, such radii being selected for forming the external configuration. In a particular embodiment, the fuel tank has an initial portion, a midsection portion and a final portion and the cross-sectional shape of the initial portion of the fuel tank is that of two overlapping circles whose centers are positioned above one another, each of the circles being formed by two of the four lobes. In the midportion of the fuel tank, the cross-sectional shape is that of four overlapping circles whose centers are positioned to form a four-lobed closed arcuate figure. In the final portion of the fuel tank, the cross-sectional shape of the fuel tank is that of two overlapping circles whose centers are positioned aside one another, each of the circles being formed by two of the four lobes. When two such fuel tanks are placed side-by-side, the combined external surfaces closely approximate a large portion of the shape of the re-entry vehicle.

The novel features which are believed to be characteristic of the invention, both as to its organization and method of operation, together with further objects and advantages thereof, will be better understood from the following description in connection with the accompanying drawings in which the presently preferred embodiment of the invention is illustrated by way of example. It is to be expressly understood, however, that the drawings are for purposes of illustration and description only and are not intended as a definition of the limits of the invention.

BRIEF DESCRIPTION OF THE DRAWINGS

FIG. 1 is a rear perspective view illustrating a selected lifting body re-entry vehicle.

FIG. 2 is a front perspective view illustrating the structure of the present invention.

FIG. 3 is a rear perspective view illustrating the structure of the present invention.

FIG. 4 is a rear perspective view illustrating in more detail the structure of the present invention.

FIG. 5 is an exploded view of a four-lobed fuel tank illustrating the structure and method of implementing the present invention.

FIG. 6 is a diagrammatic top view of a selected lifting body re-entry vehicle illustrating the placement of the fuel tanks therein.

DESCRIPTION OF THE PREFERRED EMBODIMENT

Figure 7A:
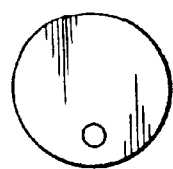
FIGS. 7A–I are cross-sectional views of the fuel tanks of the vehicle of FIG. 6 at selected cross-sections along the vehicle as shown in FIG. 6.
Figure 7B:
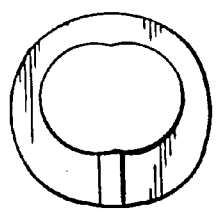
Figure 7C:
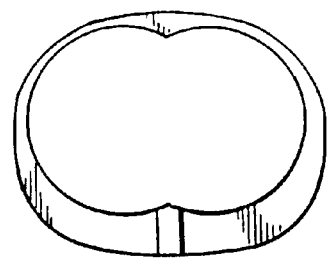
Figure 7D:
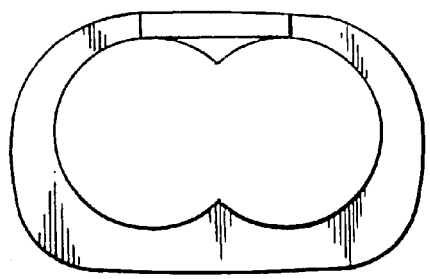

Referring now to FIGS. 1–4, the present invention is illustrated in its intended environment, with FIG. 1 showing a selected re-entry vehicle 10 with a bottom lifting surface 12, vertical fins 14, canted fins 16 and umbilical panels 18, shown in more detail in FIGS. 2 and 3. A cargo bay 20 carried internal of the vehicle 10 is shown in FIGS. 2 and 3 and fuel lines 22 for coupling fuel to the engines 18 are shown in FIG. 4. In FIGS. 2–4, the vehicle 10 is illustrated without its external skin showing the placement of the various fuel tanks therein. In the nose portion 24 of the vehicle 10, a single liquid oxygen tank 26 is positioned, usually made of aluminum, while in the body portion 28 of the vehicle 10 is positioned a plurality of main liquid hydrogen tanks 30a and 30b, usually made of a composite material, which tanks 30a,b are the subject of this invention. An auxiliary liquid hydrogen tank 31 is also carried in the body portion 28, as shown in FIG. 6.

Referring now to FIGS. 4 and 5, the tank 30a or 30b, hereinafter referred to as tank 30, is formed from four elongated lobes, or tank quadrants, 32a,b,c,d mated together to form a single quad-lobe tank 30. In order that the tank 30 has high integrity and is able to withstand the stresses of the internal liquid hydrogen in addition to the normal aerodynamic stresses, the exterior tank walls or surfaces 34 have selected cylindrical shapes 36 and conical shapes 38 with variable cross-sectional radii to provide the tank 30 with hoop tension stresses. Since the surfaces 34 can vary in shape, as long as the external surface 34 of each lobe 32a,b,c,d along a cross-section is circular, the surfaces 34 can be made to conform to at least a portion of the adjacent external skin of the vehicle 10 and thus maintain a high packing efficiency. When a pair 30a,b of such four elongated lobes 32a,b,c,d are positioned in a side-by-side relationship, then the combined external configuration of surfaces 34 of such pair 30a,b of four elongated lobes 32a,b,c,d which have a multiplicity of cylindrical shapes 36 and conical shapes 38 would closely approximate a large portion of the external shape of the vehicle 10. As shown in FIGS. 4 and 5, the lobes 32a,b,c,d are bonded together and provided additional integrity by frames 40 and longerons 42 bonded to the surfaces 34 of the lobes 32a,b,c,d.

Figure 7G:
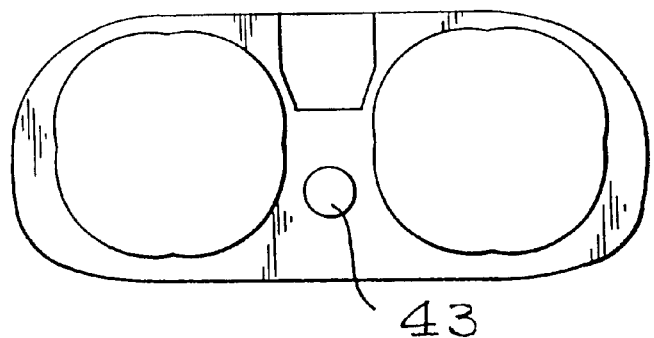
Figure 7H:
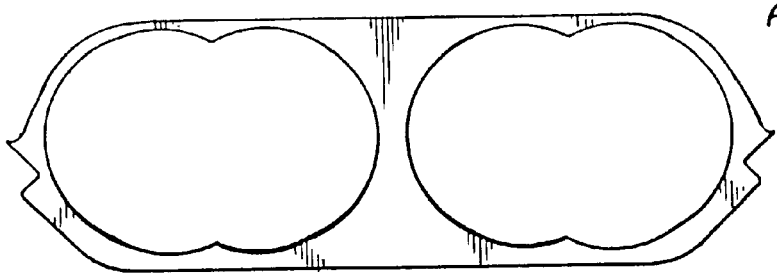
Figure 7F:
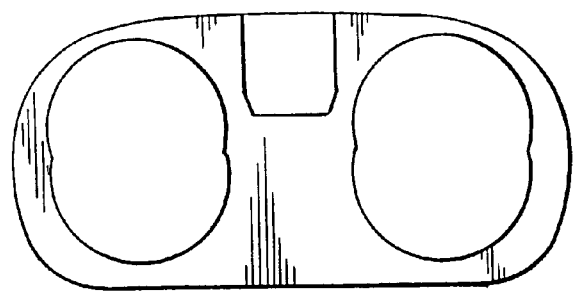
Figure 7E:
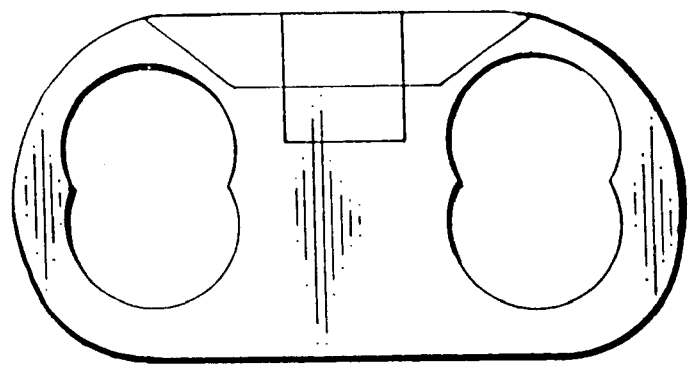
Figure 7I:
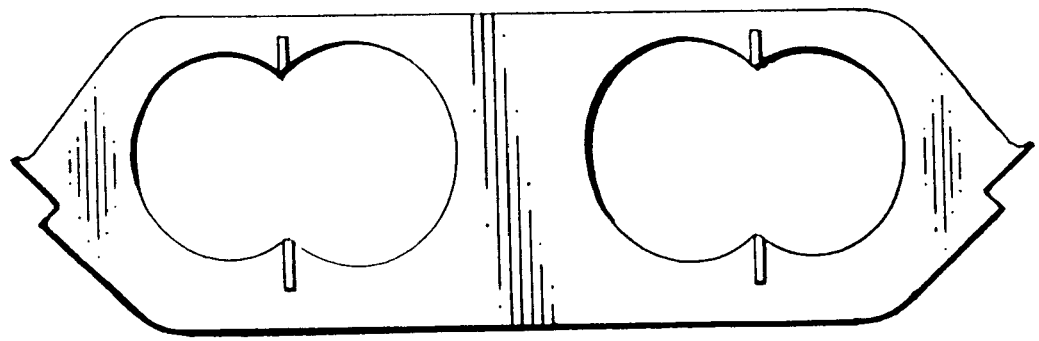

Referring now to FIGS. 6 and 7A–I, a diagrammatic top view of a lifting body re-entry vehicle 10 is shown illustrating the placement of the fuel tank 26 in the nose portion 24 of the vehicle 10 and the fuel tanks 30 and 32 in the body portion 28 of the vehicle 10 along with cross-sectional views of such tanks at selected positions along the vehicle 10. FIGS. 7A–7D show a cross-section of fuel tank 26 with the cross-section progressing from circular in FIG. 7A to lesser overlapping circles from FIGS. 7B to 7D indicating a bi-lobed tank 26. The auxiliary tank 31 is indicated in cross-section by the circle 43 in FIG. 7G. The changing shape of the quad-lobe tank 30 is shown by the changing cross-sections in FIGS. 7E–I, with each lobe retaining its circular external surface. In FIG. 7E, in the initial portion 44 of the tank 30, the two upper lobes and the two lower lobes each combine to form partial circles with centers positioned above one another with the result that the four lobes combine to form two vertically overlapping circles. In FIG. 7F, the same condition applies with the radii of the circles being slightly increased. In FIG. 7G, in the midportion 46 of the tank 30, the centers of the circles have been moved or positioned so that the cross-sectional shape of the tank 30 is that of four overlapping circles which form a four-lobed closed arcuate figure. In FIG. 7H, in the final portion 48 of the tank 30, the two left side lobes and the two right side lobes each combine to form partial circles with centers positioned beside one another with the result that the four lobes combine to form two side-by-side horizontal overlapping circles. In FIG. 7I, the same condition applies with the radii of both of the circles being slightly decreased, but with the outside partial circle appearing smaller due to the divergence of the fuel tank 30 from a longitudinal center line.

While the invention has been described with reference to a particular embodiment, it should be understood that the embodiment is merely illustrative as there are numerous variations and modifications which may be made by those skilled in the art. Thus, the invention is to be construed as being limited only by the spirit and scope of the appended claims.

What is claimed is:

1. An improved fuel tank for use in a lifting body re-entry vehicle having a particular external shape comprising: an initial portion, a midportion and a final portion, said improved fuel tank further comprising four elongated lobes each having an external surface, each of said external surfaces having selected cylindrical and conical shapes, said lobes being selectively mateable to form a combined external configuration having a multiplicity of cylindrical and conical shapes conformable to at least a portion of said external shape of said vehicle, cylindrical and conical shapes having variable radii at selected cross-sections thereof, said radii being selected for forming said combined external configuration, said initial portion having a cross-sectional shape and said cross-sectional shape of said initial portion is that of two overlapping circles whose centers are positioned above one another, each of said circles being formed by two of said four lobes, said midportion has a cross-sectional shape and said cross-sectional shape of said midportion is that of four overlapping circles whose centers are positioned to form a four-lobed closed arcuate figure.

2. The improved fuel tank of claim 1 wherein said final portion of said fuel tank has a cross-sectional shape and said cross-sectional shape of said final portion of said fuel tank is that of two overlapping circles whose centers are positioned beside one another, each of said circles being formed by two of said four lobes.

3. The improved fuel tank of claim 1 wherein there are a pair of said four elongated lobes in a side-by-side relationship, whereby the combined external configuration of surfaces of each of said pair of four elongated lobes having a multiplicity of cylindrical shapes and conical shapes closely approximate a large portion of said external shapes of said vehicle.

* * * * *